United States Patent [19]
Filas

[11] Patent Number: 5,892,618
[45] Date of Patent: Apr. 6, 1999

[54] LOW POLARIZATION SENSITIVITY GOLD MIRRORS ON SILICA

[75] Inventor: Robert William Filas, Somerset County, N.J.

[73] Assignee: Lucent Technologies, Inc., Murray Hill, N.J.

[21] Appl. No.: 960,502

[22] Filed: Oct. 29, 1997

Related U.S. Application Data

[62] Division of Ser. No. 715,134, Sep. 18, 1996, which is a continuation of Ser. No. 356,823, Dec. 15, 1994, abandoned.

[51] Int. Cl.⁶ .................. F21V 9/04; G02B 5/08; G02B 6/26
[52] U.S. Cl. .................. 359/360; 359/584; 359/585; 359/589; 359/883; 359/884; 385/31; 385/38
[58] Field of Search .................. 359/359, 360, 359/584, 585, 589, 883, 884; 385/31, 38

[56] References Cited

U.S. PATENT DOCUMENTS

| | | |
|---|---|---|
| 3,746,911 | 7/1973 | Nathanson et al. . |
| 3,781,077 | 12/1973 | Groth . |
| 3,798,146 | 3/1974 | Wan et al. . |
| 3,826,728 | 7/1974 | Chambers et al. . |
| 3,871,739 | 3/1975 | Poulsen . |
| 3,885,855 | 5/1975 | Gross . |
| 3,901,997 | 8/1975 | Groth . |
| 3,935,351 | 1/1976 | Franz . |
| 4,180,954 | 1/1980 | Gell, Jr. . |
| 4,319,264 | 3/1982 | Gangulee et al. . |
| 4,383,728 | 5/1983 | Litington . |
| 4,413,877 | 11/1983 | Suzuki et al. . |
| 4,451,119 | 5/1984 | Meyers et al. . |
| 5,253,312 | 10/1993 | Payne et al. . |
| 5,380,559 | 1/1995 | Filas et al. . |

FOREIGN PATENT DOCUMENTS

| | | |
|---|---|---|
| 0004004 | 1/1982 | Japan . |
| 0149002 | 9/1983 | Japan . |
| 0249104 | 10/1988 | Japan . |
| 1309005 | 12/1989 | Japan . |

OTHER PUBLICATIONS

J.H. Weaver et al., "Physics Data; Optical Properties of Metals," *Fachinformationszentrum*, Karlsruhe, 1981, vol. 18–1, pp. 36, 62 and 106, and vol. 18–2, pp. 59 and 75.

*Primary Examiner*—Ricky D. Shafer

[57] ABSTRACT

Gold is useful for infrared polarization-insensitive mirrors on silica. However, gold does not adhere to bare silica. The adherence is enhanced by depositing an optically thin glue layer of Ni—P on a silica surface after sensitization of the surface and activation. The Ni—P layer has a thickness sufficient to enhance adherence of gold to the surface of silica, but insufficient to act as a barrier to the passage of infrared radiation to or from the gold layer. One measure of the Ni—P thickness is the absorbance of the glue layer of >0.008 at 550 nm (>0.003 at 850 nm) as measured by a spectrophotometer. A 100–150 nm thick gold layer, deposited on this adhesion layer, adheres well enough to pass the commonly used "Scotch tape adhesion test". The ability to make gold adhere to silica with very low optical loss is useful in fabrication of lightwave devices which require the use of reflecting surfaces, such as an optical fibers or waveguides.

9 Claims, 5 Drawing Sheets

LOW POLARIZATION SENSITIVITY GOLD MIRRORS ON SILICA

This is a Division of application Ser. No. 08/715,134 filed Sep. 18, 1996, which in turn is a Continuation of application Ser. No. 08/356,823 filed Dec. 15, 1994 now abandoned.

TECHNICAL FIELD

This invention concerns gold mirrors on silica surfaces, such as on an inclined end section surface of an optical fiber.

BACKGROUND OF THE INVENTION

Optical transmission properties of silica make it the material of choice for infrared fiber-optic communication systems. Reflective properties of gold in the infrared make it the metal of choice for making a mirror with low polarization sensitivity. Unfortunately, gold does not adhere well to silica, so if a gold mirror is needed on a silica surface, such as an end of a silica fiber or a waveguide, then an adhesion-promoting layer must be applied before the gold is deposited. One commonly employed approach utilizes consecutive depositions of layers of titanium and platinum on the silica surface before applying the gold. These layers are, however, optically opaque due to their thicknesses needed to produce sufficient gold adhesion promotion, which are typically on the order of 100–200 nanometers (nm).

SUMMARY OF THE INVENTION

A thin metallic adhesion layer which is virtually optically transparent in the infrared is deposited by aqueous chemistry on a silica surface. Subsequent deposition of gold on the adhesion layer by e-beam evaporation produces a gold coating that adheres well and makes a gold mirror on the silica. The metal adhesion layer comprises nickel deposited in a thickness sufficient to enhance adherence of gold to the surface of silica but insufficient to act as a barrier to the passage of infrared radiation to and from the gold layer.

DETAILED DESCRIPTION

Figure 1:
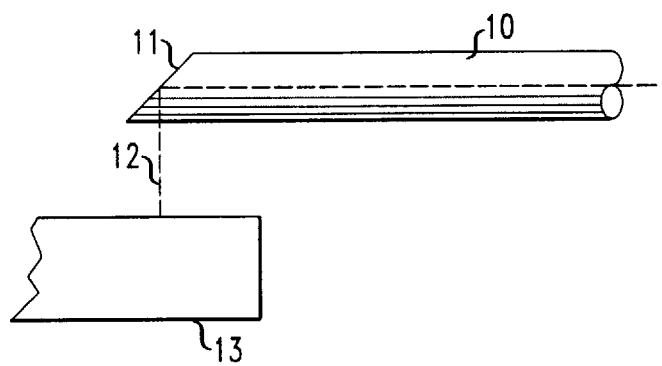
FIG. 1 is a schematic representation of a single optical fiber with a 45° mirror and a surface emitting laser (SEL) arranged for injecting radiation toward the mirror or alternatively a photodetector for receiving radiation from the mirror.
Figure 2:
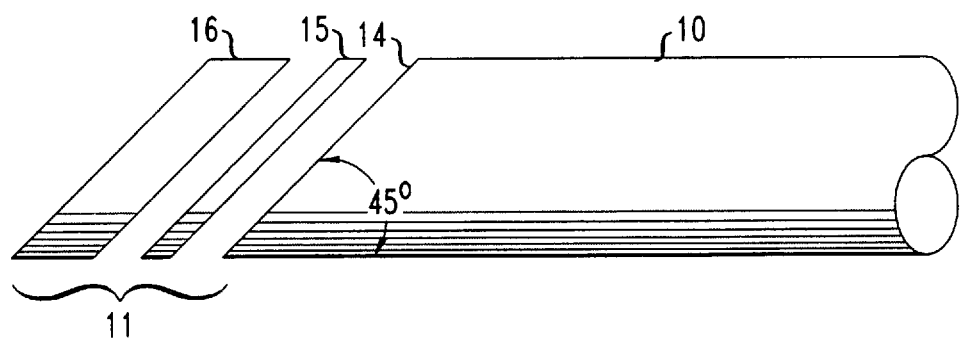
FIG. 2 is an exploded side view of the end portion of the optical fiber shown in FIG. 1 representing the silica mirror surface, a metal adhesion layer and a gold mirror layer.

In FIG. 1 of the drawing is shown schematically an end portion of an optical fiber, 10, provided with a mirror, 11, and a beam of radiation, 12, propagating from or to an optical device, 13. Beam of radiation 12, propagating from device 13 acting as a source of radiation, such as a laser, impinges upon and is reflected from the mirror into the optical fiber. Conversely, the beam of radiation propagating through the fiber, will impinge upon the mirror and will be reflected out of the fiber, e.g., toward device 13 acting as a detector of radiation, such as a photodetector. For good coupling into and from the optical fiber, high a reflectance mirror is needed. This characteristic is provided by mirror 11 deposited on a surface, 14, of the optical fiber. The mirror includes an adhesion-promoting (or glue) layer 15, and a reflective gold layer, 16, as is shown in an exploded view of FIG. 2.

In accordance with this invention, glue layer 15 is a thin layer comprising nickel. As deposited from a hypophosphite-containing electroless nickel solution, a nickel-phosphorus alloy (Ni—P) is produced. The glue layer is deposited in a thickness sufficient to enhance adhesion of gold to the silica surface of the optical fiber but insufficient to act as a barrier to the passage of infrared radiation, e.g., at 850 nm, to and from the gold layer. After sensitization of the silica with $SnF_2$ and activation with $PdCl_2$/HCl, Ni—P is deposited in the electroless bath through a nucleation and growth mechanism, detectable by atomic force microscopy (AFM). Once the activated silica is placed in the nickel bath, Ni—P begins to deposit at scattered nucleation sites and grow laterally until these "islands" coalesce to form a continuous surface of Ni—P. Growth normal to the surface presumably occurs simultaneously. Since the deposition of gold directly onto the activated sub-layer, without any nickel, results in poor adhesion of gold, it is assumed that the best case for good adhesion of gold occurs once the nickel layer becomes continuous.

It is not necessary to assume a morphology, however, to describe the deposited Ni—P layer. From a practical perspective, the amount of Ni—P can be characterized in terms of the absorbance at a given wavelength. "Absorbance" is defined in the usual way, viz. $A=-\log$ of T, where $T=I/I_0$ is the transmittance. As can be seen from FIG. 6, the absorbance increases with decreasing wavelength. By using a spectrophotometer to measure the absorbance of the layers deposited on both surfaces of a quartz slide, it is possible to correlate the absorbance at, for example, 550 nm (or any other easily accessible wavelength) with an amount of Ni—P deposited necessary to provide good adhesion. It is observed that if the absorbance of these two layers, as deposited on the quartz slide, is > than 0.008 at 550 nm (0.003 at 850 nm) then sufficient adhesion to gold is achieved. The preferred absorbance range is 0.011–0.013 at 550 nm (0.004–0.005 at 850 nm). These absorbances include a small contribution from the Pd-containing sensitization layer of about 0.0006 at 550 nm (0.0002 to 850 nm).

Prior to sensitization, the optical fibers are cleaned and polished so as to provide end surface 14 with a 45° slope. The reason for selecting a 45° angle may be explained as follows. It might appear that total internal reflection in a fiber would be sufficient to make good mirrors out of the angled fiber ends; unfortunately, the total reflection angle for silica is only about 43°, and the angular spread of the light incident on the mirror is likely to be considerably more than ±2°. At incident angles less than the critical angle, the internal reflectance of a dielectric is low and strongly polarization dependent. However, for good coupling, high reflectance is needed. In addition, it is also important to avoid a strongly polarization or position dependent reflectance that could convert laser mode or polarization fluctuations into amplitude noise. These considerations make it necessary to have an efficient reflecting coating with low polarization sensitivity on the 45° fiber ends.

The reflectance of a silica-metal interface may be calculated using the Fresnel formulas for reflection at an interface, $$r_\pi = \frac{n_0\cos\phi - N\cos\theta}{n_0\cos\phi + N\cos\theta}, \; r_\sigma = \frac{n_0\cos\theta - N\cos\phi}{n_0\cos\theta + N\cos\phi} \text{ and } R_{\pi,\sigma} = |r_{\pi,\sigma}|^2,$$

where R is reflectance, $\theta$ is the angle of incidence in the first medium, $\phi$ is the refraction angle in the second medium given by Snell's law, $n_0$ is the index of refraction in the first medium, N is the index of refraction in the second medium, $r_\pi$ and $r_\sigma$ are reflection amplitudes and $\pi$ and $\sigma$ indicate the two polarizations. For the silica fiber $n_0$ was taken as 1.46 and the components of the complex refractive index N=n+ik for different metals were obtained. J. H. Weaver et al., ed., "Physics Data: Optical Properties of Metals," *Fachinformationszentrum,* Karlsruhe, 1981, Vol. 18-1, pages 36, 62 and 106, and Vol. 18-2, pages 59 and 75.

Figure 7:
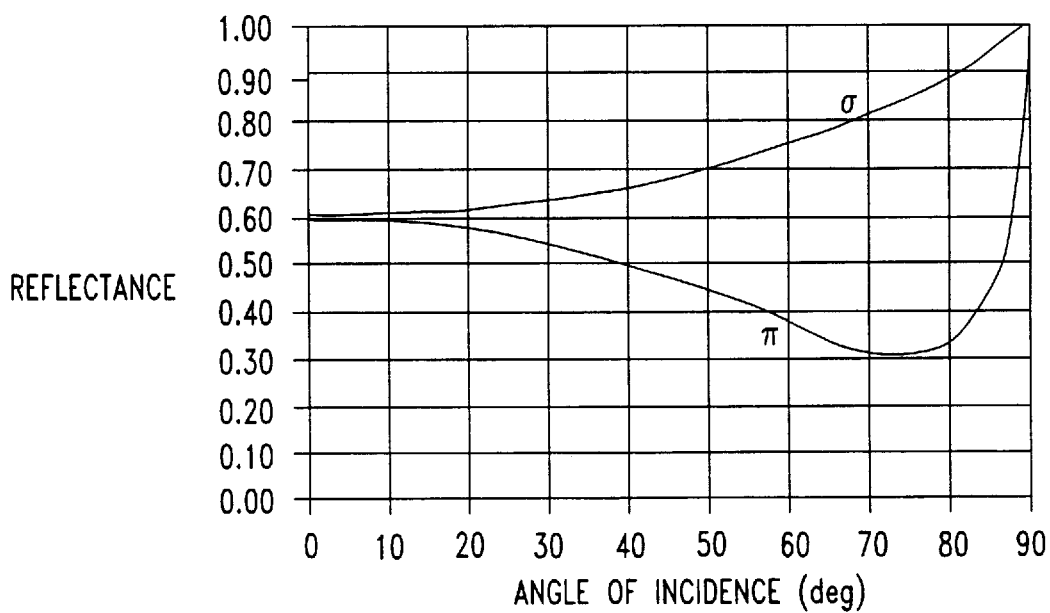
FIG. 7 is a plot of calculated reflectance at silica-nickel interface versus an angle of incidence (in degrees) at 850 nm wavelength, with $n_0=1.46$, $n=2.58$ and $k=4.55$.
Figure 8:
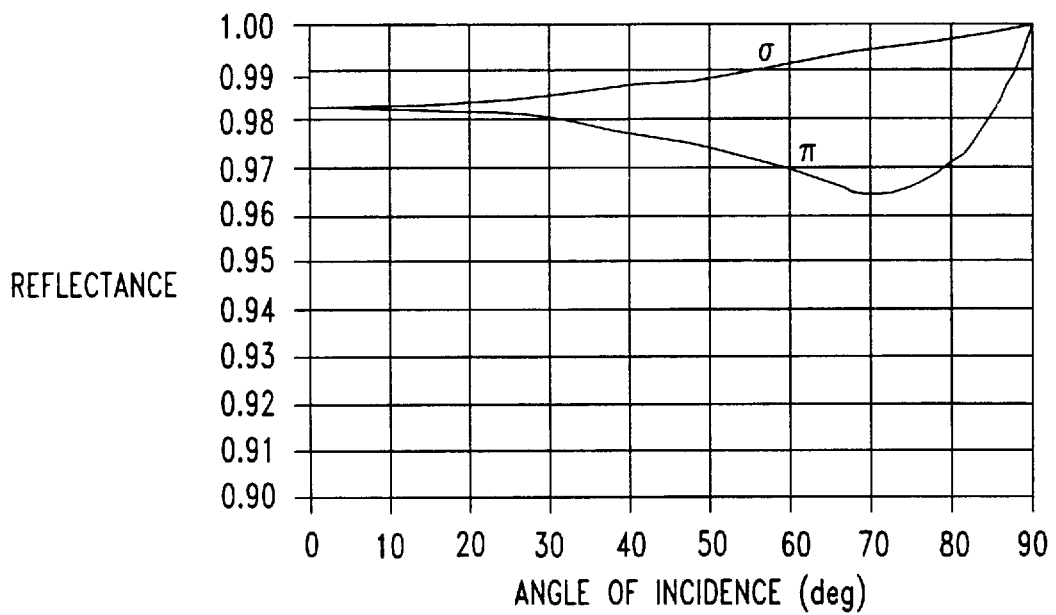
FIG. 8 is a plot of calculated reflectance at silica-gold interface versus an angle of incidence (in degrees) at 850 nm wavelength with $n_0=1.46$, $n=0.08$ and $k=4.98$.

Metals that adhere well, such as titanium and chromium, are poor reflectors, having reflectances of only 0.43 and 0.51 at 850 nm, respectively. While aluminum averages 0.82 at 850 nm, it is not suitable as a low polarization sensitive mirror since its two polarizations are differing by 13%. Nickel which has an average reflectance near 45° of less than 0.6 (FIG. 7) is also a poor reflector. FIG. 8 shows the calculated silica-gold reflectance at 850 nm versus angle of incidence for the two polarizations. Near 45° the average reflectance is ~98%, and the two polarizations differ by only ~1%. It is clear that except for its adhesion properties gold is the best metal for the mirror on silica.

After the polishing step, end surface 14 of the fiber is cleaned, primarily to remove the residues remaining from the polishing step. The cleaning may be conducted in a hot sulfuric acid; alternatively, the residues could be removed by immersion in 18 MΩ water with ultrasonic treatment for 10 minutes, followed by blowing dry with nitrogen. Thereafter, fibers are put into a Ultra-Violet Ozone Cleaning System (UVOCS), Model T10X10 OES, for 10 minutes.

Glue film 15 is deposited on polished and cleaned surface 14 of the optical fiber followed by formation of gold layer 16 on the glue film. A feasible process for depositing adherent nickel deposits on silica is described in the copending application, U.S. Ser. No. 08/054,921, filed Jan. 27, 1994 in the name of R. W. Filas et al., which is incorporated herein by reference. That process may be used with certain modifications to deposit the nickel-containing glue layer.

The deposition process of the glue film includes immersion of the polished and cleaned surface 14 of the silica-containing optical fiber into an aqueous solution of $SnF_2$, 51, within a container, 52, overflow rinse 53, immersion of the sensitized end into an activating aqueous solution of $PdCl_2$ and HCl, 54, within a container, 55, overflow rinse 56, and immersion into an electroless nickel plating solution, 57, within a container, 58, for a period sufficient to produce a desired absorbance, followed by a rinse, 59, within a container, 60, and blow drying the nickel-coated end by an inert gas, such as nitrogen, supplied from a nozzle, 61. The dried nickel-coated surface is then placed into a vacuum chamber, 62, for e-beam deposition of gold layer, 16.

$SnF_2$ solution, 51, contains from 0.5 to 3 g/L, preferably 1.0 g/l $SnF_2$. $PdCl_2$ solution, 54, contains from 2 g/L to 10 g/L, preferably 6 g/L $PdCl_2$ in dilute HCl (from greater than 0.001 M to less than 0.1 M, preferably 0.02 M HCl) with pH range up from 1.6 to 1.7. All rinses, and especially the rinse following the sensitization step, are conducted with deionized water.

The deionized water rinses 53 and 56 after the $SnF_2$ and $PdCl_2$ steps are short, about 20 second overflow rinses. The overflow was achieved by pumping the deionized water into the bottom of containers, 63 and 64, respectively, each positioned within a larger overflow-catching container, 65 and 66, respectively. The water overflowed into the larger container from which it was recirculated. The pumping was conducted with a Cole-Parmer peristaltic pump and Masterflex type 6412-16 tubing (Viton) at a flow rate of about 230 ml/min. Alternatively, any pump which does not contaminate the water can be used to create an overflow rinse. The $SnF_2$ rinse container 63 was equipped with a fine porosity sintered glass frit, 67, for deoxygenating the water with bubbled inert gas, such as nitrogen. The nitrogen bubbling was discontinued during the overflow rinse. The process up to and including the $PdCl_2$ step was carried out under nitrogen atmosphere, such as inside a Plexiglass nitrogen containing box, 68. Beginning with the $PdCl_2$ rinse step, all processing was carried out under air, so no frit was necessary in rinse container, 64.

After $PdCl_2$ rinse 56 the fiber is transferred to electroless nickel bath, 57. The electroless nickel plating solution was a commercially obtainable solution provided as two separate parts, part A and part B, which are to be combined prior to use. Part A is a source of nickel ions, such as nickel chloride, nickel sulfate and nickel acetate, and part B is a source of hypophosphite ions (a reducing agent) such as sodium hypophosphite. One type of nickel plating solution is obtainable from Fidelity Chemical Products Corporation, Newark, N.J., as type 4865 in which part A contains nickel sulfate and part B contains sodium hypophosphite, sodium hydroxide and acetic acid. The nickel solution is prepared by combining part A, part B, and water, the solution having pH ranging from 4.5 to 5.2. The nickel solution for use in this metallization process was prepared by combining part A, part B and 18 MΩ water in the ratio 1:3:16, then filtering using the Halgne Media-Plus filter unit (nylon 0.2 micrometer pores). The pH of this solution was about 4.85. The electroless nickel solution was maintained at 35±1° C. and the plating time was chosen to range from 30–60 seconds. These times correspond to the deposition of Ni—P films having an absorbance of 0.01 at 550 nm when measured for the Ni—P and gold layers.

After nickel (Ni—P) deposition, the samples were dipped into D.I. water rinse, 59, blown dry with nitrogen at 61, and mounted in a vacuum chamber, 62, for electron beam (e-beam) deposition of gold. The gold layer was deposited in a thickness from 100 to 150 nm. Thicknesses less than 100 nm may lead to inferior mirror interface, while mirrors thicker than 150 nm are uneconomical leading to waste of gold. Preferred thickness lies around 120 nm of gold. To reduce the possibility of formation of nickel oxide on the Ni—P film, samples are placed under vacuum, typically within less than 1 hour after the drying with nitrogen.

Figure 6:
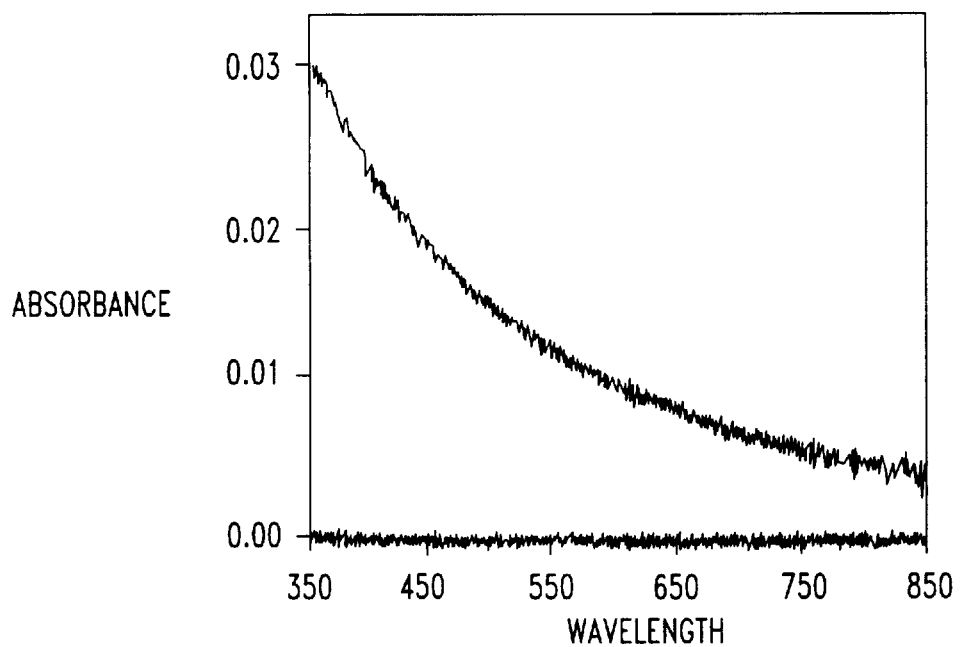
FIG. 6 is a plot of absorbance versus wavelength in nanometers for a silica slide coated on both sides with a nickel layer after treatment for 20 seconds in an electroless Ni solution at 35° C.

Adhesion was evaluated by applying Scotch Magic Tape to the gold surface and peeling the tape off. If the gold remained on the substrate the adhesion was considered satisfactory. In order to facilitate adhesion testing, the mirrors were produced on relatively large silica slides (1"×1"×3 mm) purchased from National Scientific, Quakertown, Pa. These slides also had an index of refraction, $n_0$, of 1.46. The slides were also used for optical absorption measurements. The slides were coated on one and on both major surfaces by a process similar to that used for producing mirrors on the ends of optical fibers except that there was no need for producing 45°-slanted surfaces. Prior to coating the slides with an adherent metal layer comprising Pd and Ni—P films, each of the slides was cleaned by immersion in sulfuric acid at 150° C., cooled to room temperature, rinsed in 18 MΩ water, and blown dry with nitrogen. Optical absorption measurements were performed on the slides using a Varian Cary 219 spectrophotometer. The absorbance vs wavelength is shown in FIG. 6. The baseline was recorded using clean quartz slides in both beam paths. To measure the absorbance, the metal layer comprising Pd and Ni—P films was deposited on both sides of the slides. Immediately after measuring the absorbance of the Pd/Ni—P layer, the samples were mounted in a vacuum chamber for e-beam deposition of gold.

An accurate determination of the absolute reflectance of the gold mirror on silica fibers is difficult. However, a measurement of the ratio of the reflectances was made for the $\sigma$ and $\pi$ polarizations. The $\sigma/\pi$ ratio in two measurements was found to be 0.983 and 1.020, which are within measurement error of the calculated value of about 1.012. In any case, the polarization difference is sufficiently small. Incidentally, while the actual magnitude of the reflectance was not measured, it is deduced that it is likely to be at least ~96% from the observation that the difference between unity and the $\sigma$ reflectances is always comparable to the difference between the $\sigma$ and $\pi$ reflectances. It is concluded that the optical performance of this gold mirror is not significantly impaired by the very thin adhesion layers used in this process.

Figure 3:
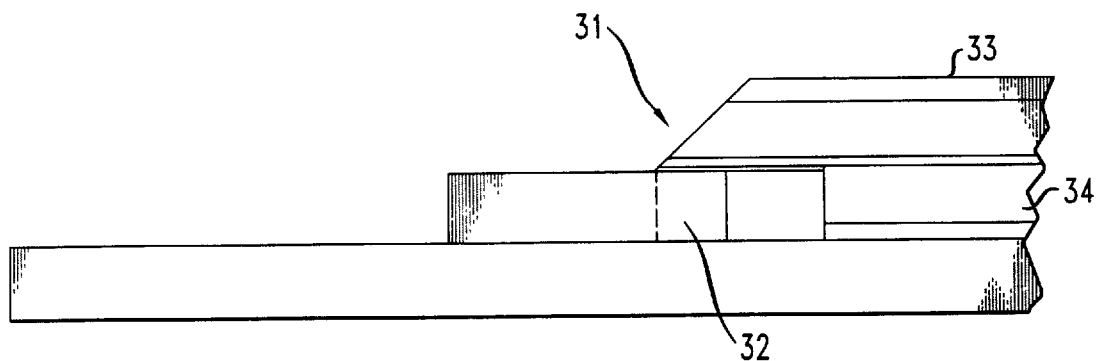
FIG. 3 is a side view of a fiber array block with a plurality of optical fibers supported in a preset relation to a SEL chip provided with a corresponding array of SELs.
Figure 4:
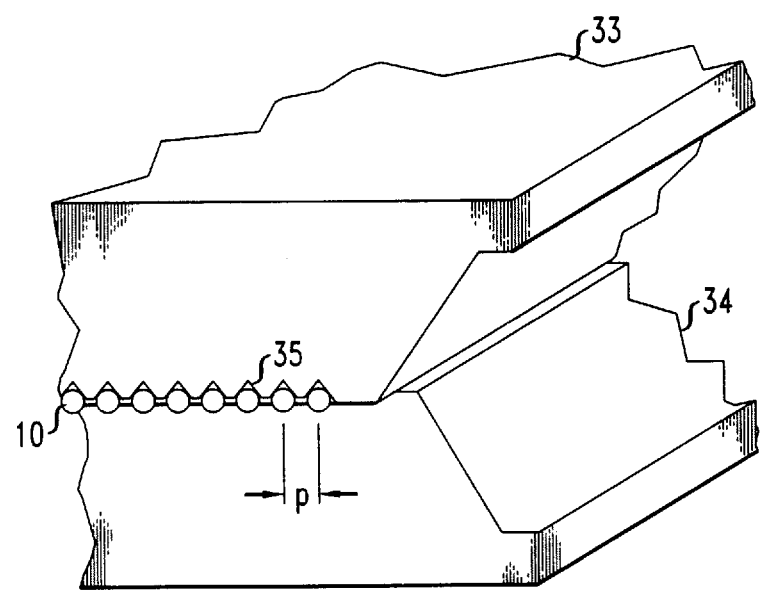
FIG. 4 is a schematic perspective representation of the array block showing mirror-carrying fiber ends.
Figure 5:
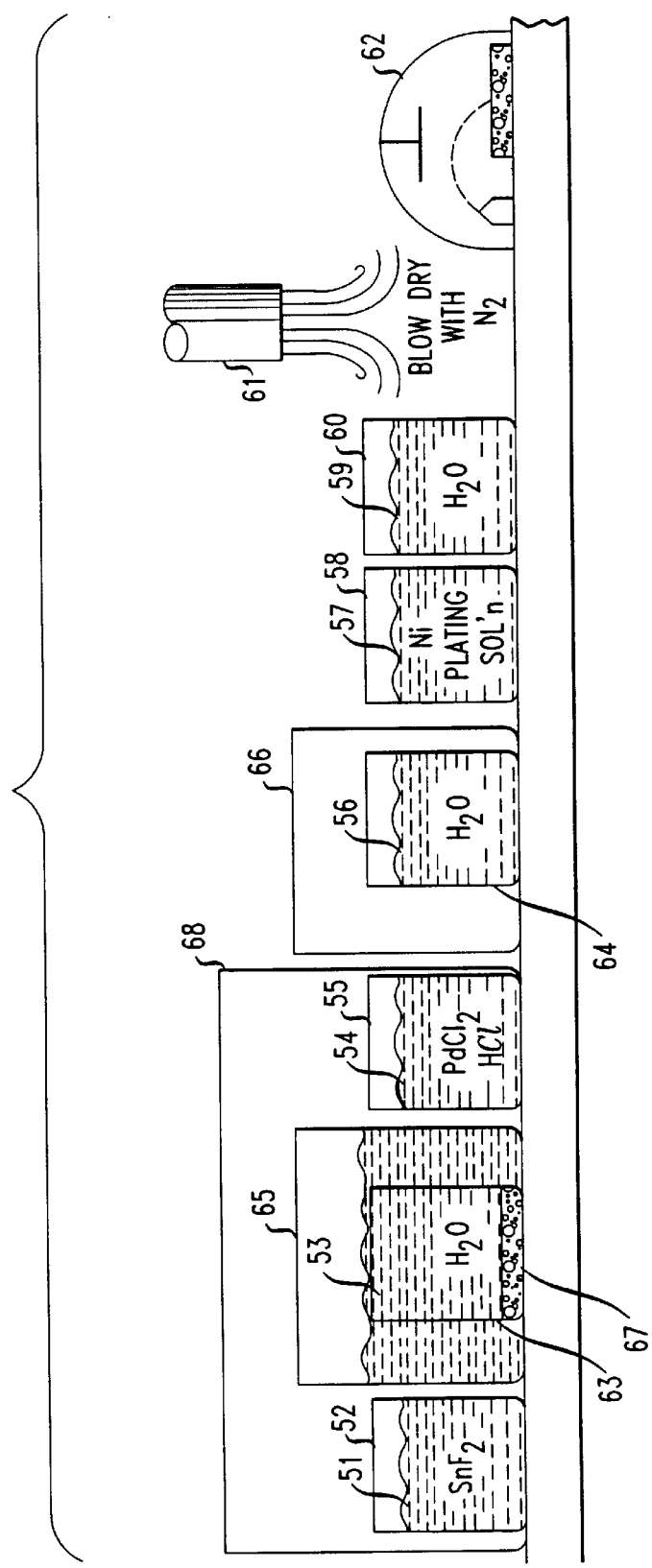
FIG. 5 is a schematic representation of apparatus in a flow chart scheme for producing the metal-deposition steps in the formation of mirrors on silica-surfaces.

This process is useful to make gold mirrors on the ends of optical-fibers for use in a multiple optical fiber array schematically shown in FIGS. 3 and 4, such as in the transmitter or receiver portion of the Optoelectronic Technology Consortium (OETC) high performance data link. The latter uses an optical data bus in the form of a fiber array block, 31, consisting of 32 parallel multimode fibers 10 each capable of carrying 500 Mb/s. Transmitter and receiver modules, 32, are identical in optical design and mechanically very similar. The transmitter uses, for example, a GaAs vertical cavity surface emitting laser (VCSEL) array operating at 850 nm, with beam of light 12 (FIG. 1) vertically-emitted from the lasers reflected into an array of 32 horizontal optical fibers 10 by 45° mirrors 11 on the polished ends of the fibers. This array of 45° polished fibers 10 is sandwiched between two silicon chips, 33 and 34, with etched v-grooves, 35, to position the fibers at the correct pitch, p, of 140 $\mu$m (see FIG. 4). This fiber array block assembly connects directly to a 32-fiber cable via a connector (not shown), such as a modified AT&T MAC II connector. The receiver uses a similar optical fiber array, except that the array of VCSELs is replaced by an array of photodiodes.

In the preceding pages, the process of producing mirrors was described with reference to treating single or bunched optical fibers. A preferred technique would be to place fibers 10 into the grooves of fiber array block 31, polishing the ends of the fibers to the 45° angle, cleaning the polished ends and then to deposit the glue film and the gold mirror on the ends of the assembled plurality of the fibers.

I claim:

1. A gold mirror on a silica article for reflecting radiation of wavelength between about 550 nm and about 850 nm from the silica articles comprising:
   a gold layer; and
   a nickel layer forming an adhesion layer between a surface of said silica article and said gold layer;
   wherein said nickel layer is deposited on said surface of said silica article by electroless plating, and said nickel layer has a thickness such that said nickel layer is substantially transparent to infrared radiation, and
   wherein infrared radiation passes through said silica article and said nickel layer substantially without being absorbed and the infrared radiation is reflected by said gold layer.

2. The gold mirror of claim 1, in which said surface of said silica article is an end surface of an optical fiber.

3. The gold mirror of claim 2, in which said end surface is inclined about 45°.

4. The gold mirror of claim 1, wherein said nickel layer comprises a Ni—P alloy.

5. A gold mirror on a silica article for reflecting radiation of wavelength between about 550 nm and about 850 nm from the silica article, comprising:
   a gold layer; and
   an adhesion layer disposed between and contacting a surface of the silica article and the gold layer, the adhesion layer comprising a Ni—P alloy;
   wherein the adhesion layer has a thickness such that the adhesion layer is substantially transparent to infrared radiation; and
   wherein infrared radiation passes through the silica article and the adhesion layer substantially without being absorbed and the infrared radiation is reflected by the gold layer.

6. The gold mirror of claim 5, wherein the surface of the silica article is an end surface of an optical fiber.

7. The gold mirror of claim 6, wherein the end surface of the optical fiber is inclined at an angle of about 45°.

8. An optical fiber device, comprising:
   a) an optical fiber having an end surface;
   b) a gold mirror on the end surface of the optical fiber for reflecting radiation of wavelength between about 550 nm and about 850 nm from the optical fiber, comprising:
   a gold layer; and
   an adhesion layer disposed between the end surface of the optical fiber and the gold layer, the adhesion comprising a Ni—P alloy;
   wherein the adhesion layer has a thickness such that the adhesion layer is substantially transparent to infrared radiation; and
   wherein infrared radiation passes through the optical fiber and the adhesion layer substantially without being absorbed and the infrared radiation is reflected by the gold layer.

9. The optical fiber device of claim 8, wherein the end surface of the optical fiber is inclined at an angle of about 45°.

* * * * *